United States Patent

Schulze et al.

[11] 3,725,537
[45] Apr. 3, 1973

[54] PROCESS FOR THE OXIDATION OF HYDROGEN SULFIDE TO ELEMENTARY SULFUR

[75] Inventors: Gerhard Schulze, Ludwigshafen; Wolfgang Heck, Viernheim, both of Germany

[73] Assignee: Badische Anilin-Soda-Fabrik Aktiengesellschaft, Ludwigshafen am/Rhine, Germany

[22] Filed: Feb. 19, 1971

[21] Appl. No.: 117,093

[52] U.S. Cl. .................................. 423/575, 423/222
[51] Int. Cl. .............................................. C01b 17/04
[58] Field of Search ........................... 23/2, 225, 226

[56] References Cited

UNITED STATES PATENTS

| | | | |
|---|---|---|---|
| 3,441,379 | 4/1969 | Renault | 23/226 |
| 3,161,461 | 12/1964 | Deal et al. | 23/225 |
| 3,284,162 | 11/1966 | Deal et al. | 23/225 |
| 3,023,088 | 2/1962 | Burban et al. | 23/226 |

FOREIGN PATENTS OR APPLICATIONS

| | | | |
|---|---|---|---|
| 1,014,081 | 1/1957 | Germany | 23/225 |

*Primary Examiner*—G. O. Peters
*Attorney*—Johnston, Root, O'Keeffe, Keil, Thompson & Shurtleff

[57] ABSTRACT

In the oxidation of hydrogen sulfide with oxygen or sulfur dioxide in a solvent, there is used as solvent a triamide of orthophosphoric acid of the general formula

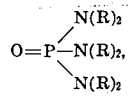

where R denotes a hydrogen atom and/or an alkyl group having up to 3 carbon atoms.

8 Claims, No Drawings

PROCESS FOR THE OXIDATION OF HYDROGEN SULFIDE TO ELEMENTARY SULFUR

Various methods are known for the removal of hydrogen sulfide from gases with the simultaneous recovery of sulfur. In the absorption methods, the hydrogen sulfide is removed from the gas to be purified by washing with a suitable absorption agent and after subsequent desorption is oxidized to sulfur for example by the Claus method. Since this method does not proceed to completion, the offgas obtained still contains fairly high amounts of hydrogen sulfide and sulfur dioxide.

In the oxidation methods, the hydrogen sulfide is absorbed into a washing liquid and directly oxidized with air or with sulfur dioxide to sulfur within the washing liquid without previous separation. These methods may be carried out in one or two stages. In a two-stage method, the hydrogen sulfide is first enriched in the reaction medium by absorption and then oxidized in the second stage; in the one-stage method, the oxidizing agent is mixed with the gas to be purified prior to washing and the oxidation proceeds together with the absorption in one zone. Water, aqueous salt solutions, polyalcohols and organic solvents such as N-methylpyrrolidone are used as solvents. Sometimes it is necessary to add oxidation catalysts such as iron (III) salts, salts of arsenic or salts of naphthoquinone or anthraquinone disulfonic acids to the solvent acting as absorption agent. These prior art solvents have however various disadvantages. In some cases the poor degree of reaction limits the method to gases having a very low content of hydrogen sulfide, something which makes scrubbing towers having large dimensions necessary. Moreover in some solvents, owing to secondary reactions, a greatly contaminated sulfur is formed which cannot be purified in a simple way by washing with water so that additional extraction processes are necessary. The poor separability of the sulfur which usually forms in a very fine state constitutes another problem. Volatility or decomposability of the solvent or the catalyst occasion losses and consequently additional costs and, in the case of volatility, result in undesired air pollution. Finally when using solutions containing arsenic, attention should be drawn to the toxicity thereof. Furthermore it should be stated that it is sometimes necessary when working up gas mixtures containing carbon dioxide to separate the carbon dioxide previously.

The object of the present invention is to carry out the oxidation of hydrogen sulfide with oxygen or sulfur dioxide or gas containing oxygen and/or sulfur dioxide in the presence of a solvent so that the disadvantages referred to above do not occur.

We have now found that this object can be achieved by carrying out the oxidation in the presence of a triamide of orthophosphoric acid having the general formula:

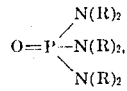

where R denotes a hydrogen atom and/or an alkyl group having up to three carbon atoms. Said triamides of phosphoric acid having at least three alkyl groups have proved to be especially suitable and triamides having six alkyl groups are preferred to those having three alkyl groups. Thus for example the reaction of hydrogen sulfide proceeds smoothly and rapidly in the presence of the derivatives containing hydrogen as R, for example the N,N',N''-trialkyl derivatives, but more highly alkylated derivatives of the triamides of phosphoric acid are preferred because of their high viscosity. Hexaalkyl derivatives, for example hexamethyl and hexaethyl phosphoric acid triamides, are therefore particularly suitable. The said solvents may also be used mixed with one another or with other solvents, for example with water. For example hexamethyl phosphoric acid triamide, mixed with 0.1 to 70 percent by weight of water, exhibits very good properties.

Particularly suitable diluents are polar, aprotic solvents whose dielectric constant is at least 20 and whose boiling point is at least 150°C at atmospheric pressure. Employing such a solvent, the process can be carried out without appreciably impairing the conversion.

The diluents preferably have a dielectric constant (measured at 25°C) of more than 40 and a boiling point at atmospheric pressure of more than 190°C.

It is also advantageous to use diluents which have good solvency for hydrogen sulfide or sulfur dioxide, i.e., diluents whose Bunsen absorption coefficient $\alpha$ (ml of gas/ml of solvent at 0°C and 760 mmHg) is at least 95 for $SO_2$ or at least 30 for $H_2S$. Obviously, the diluents should practically not react with the reaction components or with the sulfur formed.

Examples of suitable diluents are nitriles such as benzonitrile ethylene carbonate and propylene carbonate, and tetramethylene sulfone.

The diluents are advantageously used in such amounts that the concentration of the phosphoric acid triamide in the mixture is at least 5, preferably at least 10, percent by weight.

The process according to the invention is suitable for the complete desulfurization of gases or gas mixtures whose hydrogen sulfide content may vary substantially. Thus gas mixtures which contain only 0.0001 percent by volume of hydrogen sulfide can be completely desulfurized in the same way as gas having 5 percent by volume or more of hydrogen sulfide. The process may be used particularly advantageously for gases which contain sulfur dioxide as well as hydrogen sulfide, as for example the offgas from a Claus furnace.

Oxygen or air or sulfur dioxide may be used as the oxidizing agent, the sulfur dioxide preferably being used in a stoichiometric amount and the oxygen usually in excess, for example in an amount of up to twice the stoichiometrically necessary amount.

The process according to the invention may be carried out industrially in various ways. For example the gas to be purified may be first mixed with the necessary amount of oxidizing agent and then passed through an absorption tower charged with packing where it meets the recycle solvent which trickles downward. The sulfur formed during the reaction the reaction is entrained by the solvent and is separated by filtration. The gas mixed with the oxidizing agent may however also be introduced in finely divided form, for example in a bubbler, into the solvent and allowed to bubble through the reaction medium. Here again the solvent is freed at intervals from deposited sulfur.

Another embodiment which is particularly suitable for gases having very low hydrogen sulfide contents consists in impregnating with the solvent a carrier material having a large surface area such as pumice, activated carbon or diatomaceous earth and passing thereover the gas to be purified together with the oxidizing agent.

The process according to the invention may be carried out at atmospheric or superatmospheric pressure and at room temperature or elevated temperature. Generally, however, atmospheric pressure is used within the temperature range from 15°C to 120°C, preferably from 60°C to 120°C. In order to keep the water content of the solvent used constant, it is advantageous to carry out the process at a temperature at which both the steam introduced with the gas to be purified and the water of reaction formed are removed from the reaction mixture.

The sulfur is obtained in crystalline form and may be separated readily from the mother liquor by filtration, centrifuging, decantation or the like. Solvent adhering thereto, usually only in small amounts, may be removed in a simple way by washing with water. The sulfur thus purified has a degree of purity of more than 99.9 percent. Another advantage of the process according to the invention is that it is possible to process immediately a gas containing carbon dioxide, i.e., it is not necessary previously to remove in a separate operation carbon dioxide present in the gas to be purified.

The process may be carried out batchwise or continuously.

The following Examples illustrate the invention.

EXAMPLE 1

100 ml of a mixture of 10 percent by weight of water and 90 percent by weight of hexamethylphosphoric acid triamide is placed in a bubbler having a diameter of 2 cm and a height of 50 cm above the sieve plate. 70 liters per hour of a gas mixture containing 0.5 percent by volume of carbon dioxide, 0.66 percent by volume of hydrogen sulfide, 0.33 percent by volume of sulfur dioxide and 98.51 percent by volume of nitrogen is passed at 30°C through the sieve plate; this gas corresponds to an off-gas from the Claus process. Neither hydrogen sulfide nor sulfur dioxide can be detected in the off-gas leaving the bubbler. The experiment is stopped after sixty hours in order to filter off the deposited sulfur from the solvent. After washing with water and drying, a finely crystalline sulfur is obtained having a purity of 99.99 percent.

EXAMPLE 2

70 liters per hour of nitrogen containing 50 ppm of hydrogen sulfide and to which 25 ppm of sulfur dioxide has been added is passed through the apparatus described in Example 1 which contains 100 ml of a mixture of 30 percent by weight of water and 70 percent by weight of hexamethylphosphoric acid triamide. In this case too, neither hydrogen sulfide nor sulfur dioxide can be detected in the offgas.

EXAMPLE 3

At 80°C, a gas mixture of 80 liters of steam, 20 liters of carbon dioxide, 3.3 liters of hydrogen sulfide, 1.65 liters of sulfur dioxide and 295.05 liters of nitrogen is introduced per hour into an absorption tower having a length of 2 meters and a diameter of 60 mm which is filled with packing. The tower is trickled with 60 liters per hour of a solvent mixture consisting of 15 percent by weight of water and 85 percent by weight of hexamethylphosphoric acid triamide. The elementary sulfur formed is filtered off from the solvent outside the tower and the solvent freed from sulfur is returned to the tower. Even after the experiment has lasted one month, the offgas still contains less than 10 ppm of hydrogen sulfide and less than 10 ppm of sulfur dioxide There is no increase in the water content of the solvent under the said conditions. The loss of solvent by decomposition or volatility remains less than 0.5 percent by weight after the said period.

EXAMPLE 4

70 liters of nitrogen which contains 5 percent by volume of hydrogen sulfide and with which 25 percent by volume of air has been mixed as introduced per hour at 120°C into the bubbler described in Example 1 which has been charged with a mixture of 98 percent of hexamethylphosphoric acid triamide and 2 percent by weight of water. The hydrogen sulfide content of the offgas is constant at less than 10 ppm. The sulfur formed may be brought to a purity of more than 99.9 percent by washing with water.

EXAMPLE 5

70 liters of a gas mixture of 69 liters of nitrogen and 1 liter of oxygen and which contains 50 ppm of hydrogen sulfide is introduced per hour at 70°C analogously to Example 4. The offgas is again devoid of hydrogen sulfide after several days operation.

EXAMPLE 6

25 liters per hour of the gas described in Example 1 is passed at 90°C into the bubbler described in Example 1 which contains 250 ml of a solution of 75 ml of water and 175 ml of trimethylphosphoric acid triamide. The hydrogen sulfide content of the gas is less than 0.01 percent by volume after passing through the column over an experiment period of eight hours. The sulfur is in finely crystalline form and of high purity.

EXAMPLE 7

70 liters of the gas described in Example 1 is passed per hour at room temperature through the bubbler as described in Example 1 which contains 200 ml of a mixture of 90 percent by weight of hexaethylphosphoric acid triamide and 10 percent by weight of water. The effluent gas does not turn a solution of cadmium acetate yellow and is thus practically free from hydrogen sulfide. The crystalline sulfur formed is easily filtered.

EXAMPLE 8

To demonstrate the influence of the diluent for the triamide of of orthophosphoric acid and its concentration in the diluent on the reation of sulfur dioxide with hydrogen sulfide, there is filled into an absorption column 3 cm in diameter and 120 cm in height 500 ml of a solution of hexamethylorthophosphoric acid triamide in various diluents.

At 70°C, there is passed hourly through the column a gas mixture which contains, in addition to 99 percent by volume of nitrogen, 0.66 percent by volume of hydrogen sulfide and 0.33 percent by volume of sulfur dioxide.

The results obtained are given in the following table.

| Expt. Diluent | Dielectric constant | Boiling point °C | Phosphoric acid triamide concentration (% by wt.) | Conversion %, with reference to hydrogen sulfide used |
|---|---|---|---|---|
| a methyl benzoate | 6.6 | 199.5 | 5 | 85.0 |
| b benzonitrile | 26.5 | 191.3 | 5 | 89.0 |
| c tetramethylene sulfone | 42 | 285.0 | 1 | 89.0 |
| d tetramethylene sulfone | 42 | 285.0 | 5 | 96.0 |
| e " | 42 | 285.0 | 10 | 97.0 |
| f " | 42 | 285.0 | 50 | 100.0 |
| g propylene carbonate | 69 | 242 | 5 | 98.0 |
| h ethylene carbonate | 89 | 238 | 5 | 99.5 |

This table shows that conversion in diluents meeting the requirements of the invention is at least 89.5 percent at orthophosphoric acid triamide concentrations of 5 percent, whereas the methyl benzoate used in experiment a as solvent, whose dielectric constant is only 6.6, reveals a significant decrease in conversion; the conversion rate is only 85 percent.

We claim:

1. A process for the oxidation of hydrogen sulfide with oxygen or sulfur dioxide or a gas containing oxygen and/or sulfur dioxide in the presence of a solvent to form sulfur wherein the oxidation is carried out in the presence of a triamide of orthophosphoric acid having the general formula:

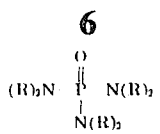

in which each R denotes a hydrogen atom and/or an alkyl group having up to 3 carbon atoms.

2. A process as claimed in claim 1 wherein a triamide of phosphoric acid is used which contains at least three alkyl groups.

3. A process as claimed in claim 1 wherein hexamethylphosphoric acid triamide or hexaethylphosphoric acid triamide is used.

4. A process as claimed in claim 1 wherein the oxidation is carried out at atmospheric pressure and at a temperature of from 15° to 120°C.

5. A process as claimed in claim 1 wherein the oxidation is carried out at atmospheric pressure and at a temperature of from 60° to 120°C.

6. A process for the oxidation of hydrogen sulfide with oxygen or sulfur dioxide or a gas containing oxygen and/or sulfur dioxide in the presence of a solvent to form sulfur wherein the oxidation is carried out in the presence of a triamide of orthophosphoric acid having the general formula:

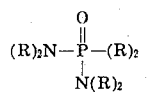

in which each R denotes a hydrogen atom and/or an alkyl group having up to three carbon atoms, said triamide of phosphoric acid being mixed with a diluent having a Bunsen coefficient α of at least 95 for $SO_2$ and of at least 30 for $H_2S$, said diluent further being substantially inert with respect to the reaction components and sulphur.

7. A process as claimed in claim wherein said diluent is a polar, aprotic solvent whose dielectric constant is at least 20 and whose boiling point at atmospheric pressure is at least 150°C.

8. A process as set forth in claim 7 wherein said diluent has a dielectric constant (measured at 25°C) of more than 40 and a boiling point at atmospheric pressure of more than 190°C.

* * * * *

UNITED STATES PATENT OFFICE
CERTIFICATE OF CORRECTION

PO-1050
(5/69)

Patent No. 3,725,537           Dated April 3, 1973

Inventor(s) Gerhard Schulze and Wolfgang Heck

It is certified that error appears in the above-identified patent and that said Letters Patent are hereby corrected as shown below:

First page, left-hand column, seventh line, "Anilin-Soda-Fabrik" should read -- Anilin- & Soda-Fabrik --.

First page, right-hand column, second line, "Burban" should read -- Urban --; fifth line of the Abstract, 

Column 1, line 62, 

Column 2, line 61, "the reaction the reaction" should read -- the reaction --.

Column 4, line 12, "dioxide" should read -- dioxide. --; line 62, "of of" should read -- of --.

Column 5, line 15, "bb" should read -- b --.

Column 6, claim 6, that portion of the formula reading "P-(R)₂" should read -- P-N(R)₂ --; line 36, "claim wherein" should read -- claim 6 wherein --.

Signed and sealed this 20th day of November 1973.

(SEAL)
Attest:

EDWARD M. FLETCHER, JR.
Attesting Officer

RENE D. TEGTMEYER
Acting Commissioner of Patents